US005867183A

United States Patent [19]

Cornell et al.

[11] Patent Number: 5,867,183

[45] Date of Patent: Feb. 2, 1999

[54] APPARATUS FOR DRIVING MULTIPLE INK JET PRINTHEADS WITH A SINGLE SET OF DRIVE OUTPUTS

[75] Inventors: Robert Wilson Cornell, Lexington; George Keith Parish, Winchester; Lawrence Russell Steward; David Steven Waldrop, both of Lexington, all of Ky.

[73] Assignee: Lexmark International, Inc., Lexington, Ky.

[21] Appl. No.: 584,033

[22] Filed: Jan. 11, 1996

[51] Int. Cl.[6] .............................. B41J 29/38; G01D 15/10

[52] U.S. Cl. .............................. 347/13; 347/180; 347/182

[58] Field of Search .............................. 347/13, 12, 180, 347/182

[56] References Cited

U.S. PATENT DOCUMENTS

| | | | |
|---|---|---|---|
| 4,026,401 | 5/1977 | Doane | 197/1 R |
| 4,141,018 | 2/1979 | Mizuguchi et al. | 347/180 |
| 4,521,805 | 6/1985 | Ayata et al. | 358/75 |
| 4,527,885 | 7/1985 | Ayata et al. | 355/3 R |
| 4,608,575 | 8/1986 | Morgan | 346/33 R |
| 4,689,694 | 8/1987 | Yoshida | 358/298 |
| 4,739,344 | 4/1988 | Sullivan et al. | 346/76 PH |
| 4,792,817 | 12/1988 | Barney | 346/140 R |
| 4,876,559 | 10/1989 | Nishikawa | 346/140 R |
| 5,144,341 | 9/1992 | El Haten et al. | 346/140 R |
| 5,157,411 | 10/1992 | Takekoshi et al. | 346/1.1 |
| 5,281,908 | 1/1994 | Kishida et al. | 346/140 R |
| 5,357,268 | 10/1994 | Kishida et al. | 347/13 |

FOREIGN PATENT DOCUMENTS

| | | | |
|---|---|---|---|
| 60-0190367 | 9/1985 | Japan | B41J 3/20 |

*Primary Examiner*—Peter S. Wong
*Assistant Examiner*—Bao Q. Vu
*Attorney, Agent, or Firm*—John J. McArdle, Jr.; Ronald K. Aust

[57] ABSTRACT

An ink jet printing apparatus includes a printhead controller including a printhead driver circuit having a set of ink jet nozzle control outputs and a printhead select circuit having a plurality of printhead select outputs. A plurality of printheads are provided, wherein each printhead includes a plurality of ink jet nozzles, a plurality of individually controllable ink jet nozzle firing circuits, and a printhead enable circuit, wherein the printhead enable circuit is electrically coupled between the plurality of individually controllable ink jet nozzle firing circuits and the set of ink jet nozzle control outputs, and wherein the printhead enable circuit is electrically coupled to one of the plurality of printhead select outputs and enables the electrical conduction of the plurality of controllable ink jet nozzle firing circuits upon receipt of a printhead select signal from one of the printhead select outputs of the printhead select circuits.

9 Claims, 3 Drawing Sheets

APPARATUS FOR DRIVING MULTIPLE INK JET PRINTHEADS WITH A SINGLE SET OF DRIVE OUTPUTS

FIELD OF THE INVENTION

The invention relates to ink jet printing apparatus, and more particularly, to ink jet printing apparatus for driving a plurality of ink jet printheads.

BACKGROUND OF THE INVENTION

Ink jet printing systems are available which have either a single printhead, or multiple printheads. In systems having multiple printheads, a separate printhead controller/driver circuit is provided for each printhead. Although providing a separate printhead controller/driver for each printhead simplifies the design implementation, such duplication typically results in an increase in cost for each printhead controller/driver added to the system.

SUMMARY OF THE INVENTION

The invention is related to an ink jet printing apparatus which includes a single printhead controller capable of controlling a plurality of printheads. The printhead controller of the invention includes a printhead driver circuit having a set of ink jet nozzle control outputs and a printhead select circuit having a plurality of printhead select outputs. Each printhead of the invention includes a plurality of ink jet nozzles, a plurality of individually controllable ink jet nozzle firing circuits, and a printhead enable circuit. The printhead enable circuit of each printhead is electrically coupled between the plurality of individually controllable ink jet nozzle firing circuits of the printhead and the set of ink jet nozzle control outputs of the printhead driver circuit. The set of ink jet nozzle control outputs is common to each of the plurality of printheads. The printhead enable circuit is electrically coupled to one of the plurality of printhead select outputs and enables the electrical conduction of the plurality of controllable ink jet nozzle firing circuits of that printhead upon receipt of a printhead select signal from one of the printhead select outputs of the printhead select circuit.

The printhead select circuit supplies a printhead select signal to the enable circuit of one of the plurality of printheads via one of the printhead select outputs to select that printhead for printing. The printhead driver circuit then supplies control signals via the set of ink jet nozzle control outputs to control the plurality of individually controllable ink jet nozzle firing circuits of the selected printhead for controlling the output of ink from the ink jet nozzle corresponding to each ink jet nozzle firing circuit.

Other features and advantages of the invention may be determined from the drawings and the detailed description of the invention that follows.

DETAILED DESCRIPTION PREFERRED EMBODIMENTS

Figure 1:
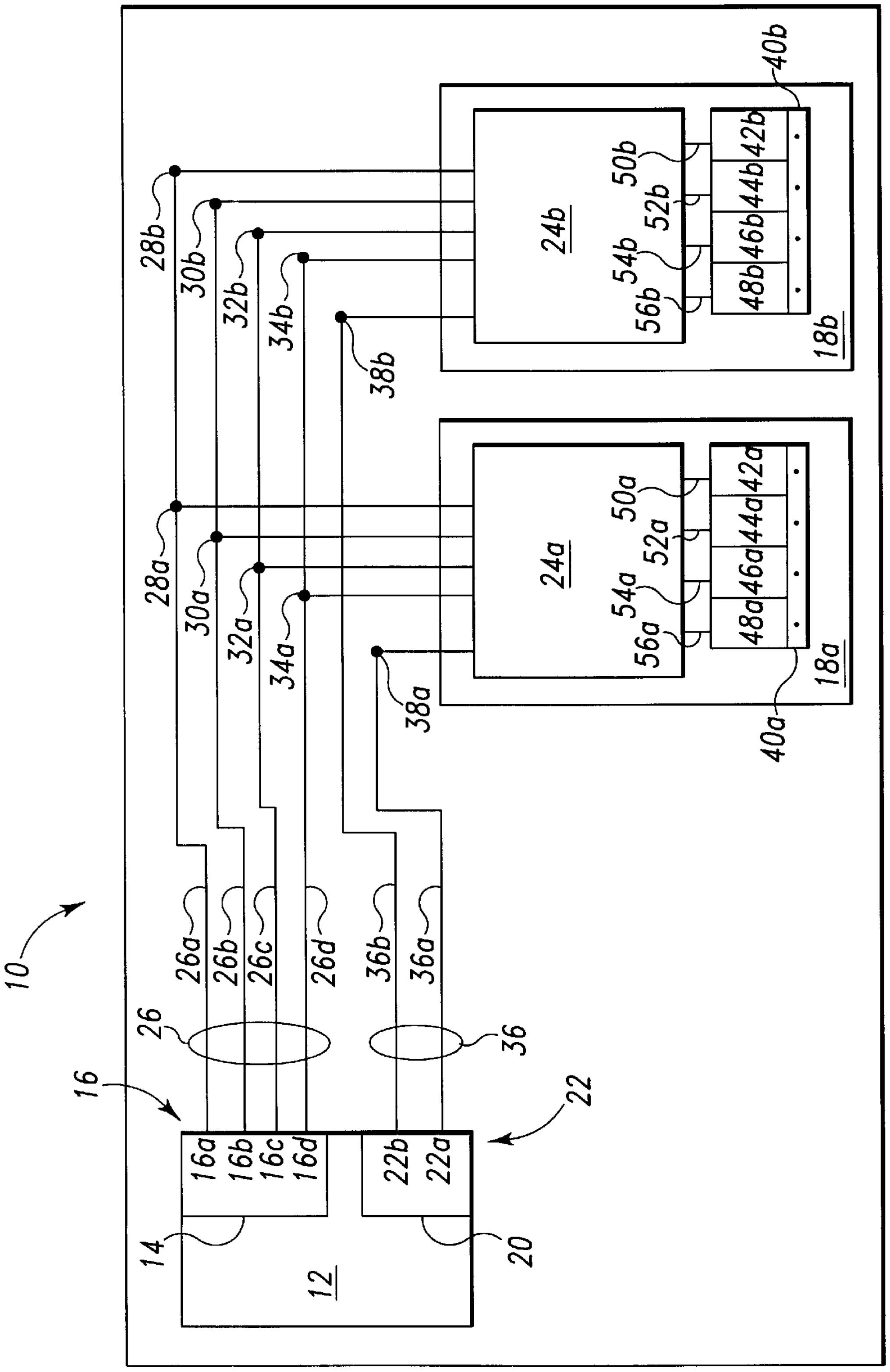
FIG. 1 schematically shows a printing apparatus embodying the invention.

FIG. 1 shows in schematic form an ink jet printer 10 embodying the invention. Ink jet printer 10 includes printhead controller 12 and printing mechanism (not shown) which cooperate to generate an image on a print medium. The invention provides for the control of multiple printheads using a single set of drive electronics. This is accomplished by providing printhead controller 12 which includes a printhead driver circuit 14 having a set of ink jet nozzle control outputs 16 for controlling the ink output of printheads 18, individually identified as 18*a* and 18*b*, and a printhead select circuit 20 providing a plurality of printhead select outputs 22 for individually selecting one of the printheads 18 for printing. Printheads 18 further include enable circuitry to allow their individual selection.

Printheads 18*a* and 18*b* are functionally equivalent. Accordingly, elements common to each of the printheads 18*a* and 18*b* will share the same numerical indicator, but will have different alphabetic suffixes. At times, common elements of the printheads and their function may be described with reference only to the numerical indicator of the element. For example, the printheads 18*a* and 18*b* each include an enable circuit 24, individually identified as 24*a* and 24*b*.

Printhead driver circuit 14 of printer controller 12 is electrically coupled to printheads 18*a* and 18*b* via a control bus 26 having a plurality of conductors 26*a*–26*d*. Conductors 26*a*–26*d* are individually connected at a first end of control bus 26 to control outputs 16*a*–16*d*, respectively, of printhead driver circuit 14. Conductors 26*a*–26*d* are individually connected at a second end of control bus 26 to ink jet nozzle control inputs 28*a*, 30*a*, 32*a* and 34*a*, respectively, of printhead 18*a*, and to ink jet nozzle control inputs 28*b*, 30*b*, 32*b* and 34*b*, respectively, of printhead 18*b*. Accordingly, ink jet nozzle control signals present at control outputs 16*a*–16*d* are available for use by either printhead 18*a* or printhead 18*b*, but only the selected printhead will be able to act on these control signals at any given time.

Printhead select circuit 20 of printer controller 12 is electrically coupled to printheads 18*a* and 18*b* via a select bus 36 having individual conductors 36*a* and 36*b*. Conductor 36*a* is connected at a first end to select output 22*a* of printhead select circuit 20. Conductor 36*a* is connected at a second end to ink jet nozzle select input 38*a* of printhead 18*a*. Likewise, conductor 36*b* is connected at a first end to select output 22*b* of printhead select circuit 20, and conductor 36*b* is connected at a second end to ink jet nozzle select input 38*b* of printhead 18*b*. Accordingly, an ink jet printhead select signal present at select output 22*a* is used to select the operation of printhead 18*a*, and an ink jet printhead select signal present at select output 22*b* is used to select the operation of printhead 18*b*, but only the selected printhead will be able to act on the control signals supplied from control outputs 16*a*–16*d* at any given time.

The printheads 18 are functionally equivalent, and each includes a plurality of ink jet nozzles 40, a plurality of individually controllable ink jet nozzle firing circuits 42, 44, 46, 48, and a printhead enable circuit 24. Each ink jet firing circuit includes an electrically responsive element (not shown), such as a thermal element or a piezoelectric element, located near one of the individual ink jet nozzles which, when electrically excited, causes an output of ink from the nozzle. The printhead enable circuit 24 of each of the printheads 18*a*, 18*b* is electrically coupled to respective ink jet nozzle firing circuits 42, 44, 46, 48 via conductors 50, 52, 54, and 56, and to control inputs 28, 30, 32, and 34, wherein each control input is associated with one nozzle firing circuit. Accordingly, when installed in printer 10, the printhead enable circuit 24 of each of the printheads 18*a*, 18*b* is electrically coupled between the ink jet nozzle firing circuits 42, 44, 46, 48 of the respective printhead and the set of common ink jet nozzle control outputs 16*a*–16*d* of printhead driver circuit 14.

Each printhead enable circuit 24 includes a dedicated select input 38 for receiving a select signal from printhead select circuit 20 of printhead controller 12. Thus, a select signal received at select input 38 is effective in enabling all the ink jet nozzle firing circuits 42, 44, 46, 48 for electrical conduction in the selected printhead, thereby allowing control signals present at control outputs 16*a*–16*d* to effect the operation of ink jet nozzle firing circuits 42, 44, 46, 48, respectively, of the selected printhead. Likewise, in the absence of a select signal at select input 38, ink jet nozzle firing circuits 42, 44, 46, 48 are disabled from electrical conduction, thereby preventing control signals present at control outputs 16*a*–16*d* from effecting the operation of ink jet nozzle firing circuits 42, 44, 46, 48, respectively, of a non-selected printhead.

Accordingly, during operation of printer 10, for example, printhead select circuit 20 supplies a printhead select signal to printhead 18*a* via conductor 36*a*, or supplies a printhead select signal to printhead 18*b* via conductor 36*b*. If, for example, printhead 18*a* receives a printhead select signal at select input 38*a*, then enable circuit 24*a* will permit control signals from the control outputs 16*a*–16*d* of printhead driver circuit 14 to effect the operation of ink jet nozzle firing circuits 42*a*, 44*a*, 46*a*, and 48*a*. The preferred operation of printhead controller 12 is such that only one of the printhead select inputs 38*a*, 38*b* will receive a select signal at any given time. Thus, in this preferred example of operation, no select signal will be supplied to select input 18*b* of printhead 38*b* until the select signal is no longer applied to select input 38*a* of printhead 18*a*. It is contemplated, however, that in some situations it may be desirable to concurrently apply select signals to multiple printhead select inputs to concurrently enable multiple printheads for simultaneous operation.

Figure 2:
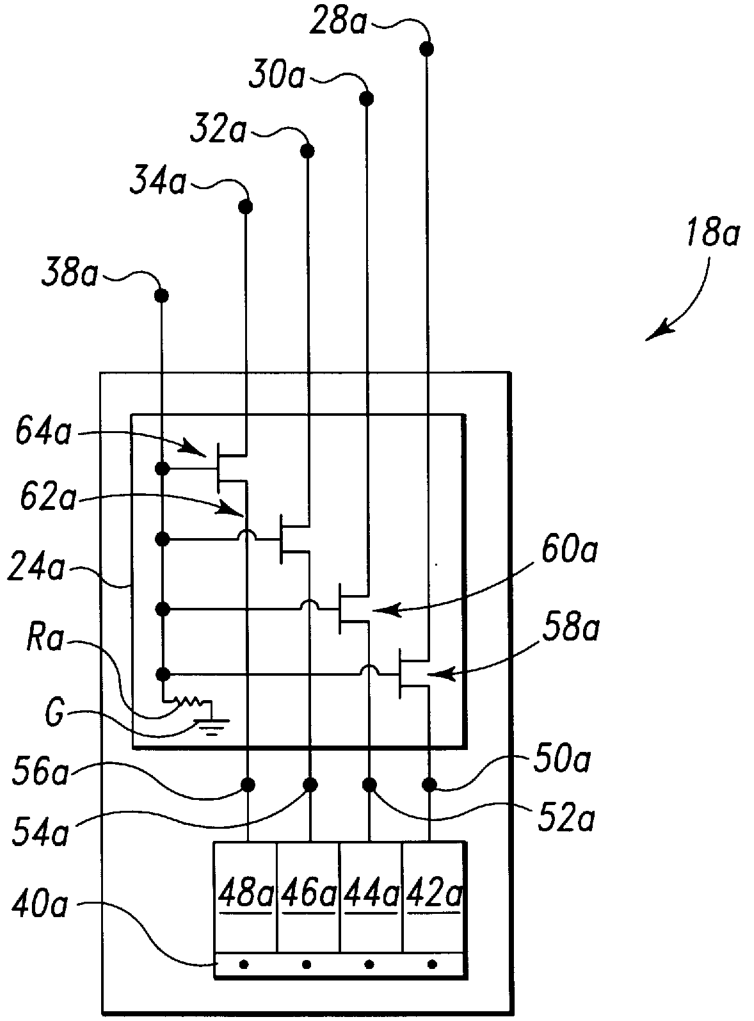
FIG. 2 shows a schematic diagram of a printhead of the invention.

FIG. 2 shows a preferred embodiment of the printhead 18 of the invention. Although FIG. 2 is specifically directed to printhead 18*a*, it should be understood that all components, connections and operations of components attributable to printhead 18*a* are equally applicable to printhead 18*b*. FIG. 2 shows a preferred embodiment of the enable circuit 24*a* of printhead 18*a* previously discussed with respect to FIG. 1. Enable circuit 24*a* includes a plurality of switch elements 58*a*, 60*a*, 62*a*, and 64*a*, such as the field effect transistors (FETs) as shown, each having a command input (gate) electrically connected to select input 38*a*. The common inputs connected to select input 38*a* are also coupled to ground G via resistor Ra. A current input (drain) of each of the switch elements 58*a*, 60*a*, 62*a*, and 64*a* is individually connected to control inputs 28*a*, 30*a*, 32*a*, and 34*a*, respectively. A current output (source) of each of the switch elements 58*a*, 60*a*, 62*a*, and 64*a* is individually connected to ink jet nozzle firing circuits 42*a*, 44*a*, 46*a*, and 48*a*, respectively.

Although enable circuit 24*a* is shown preferably constructed with switch elements 58*a*, 60*a*, 62*a*, and 64*a* as being FETs, those skilled in the art will recognize that the FETs could be replaced by any device capable of performing substantially the same function, such as for example, by replacing the FETs with bipolar transistors.

Figure 3:
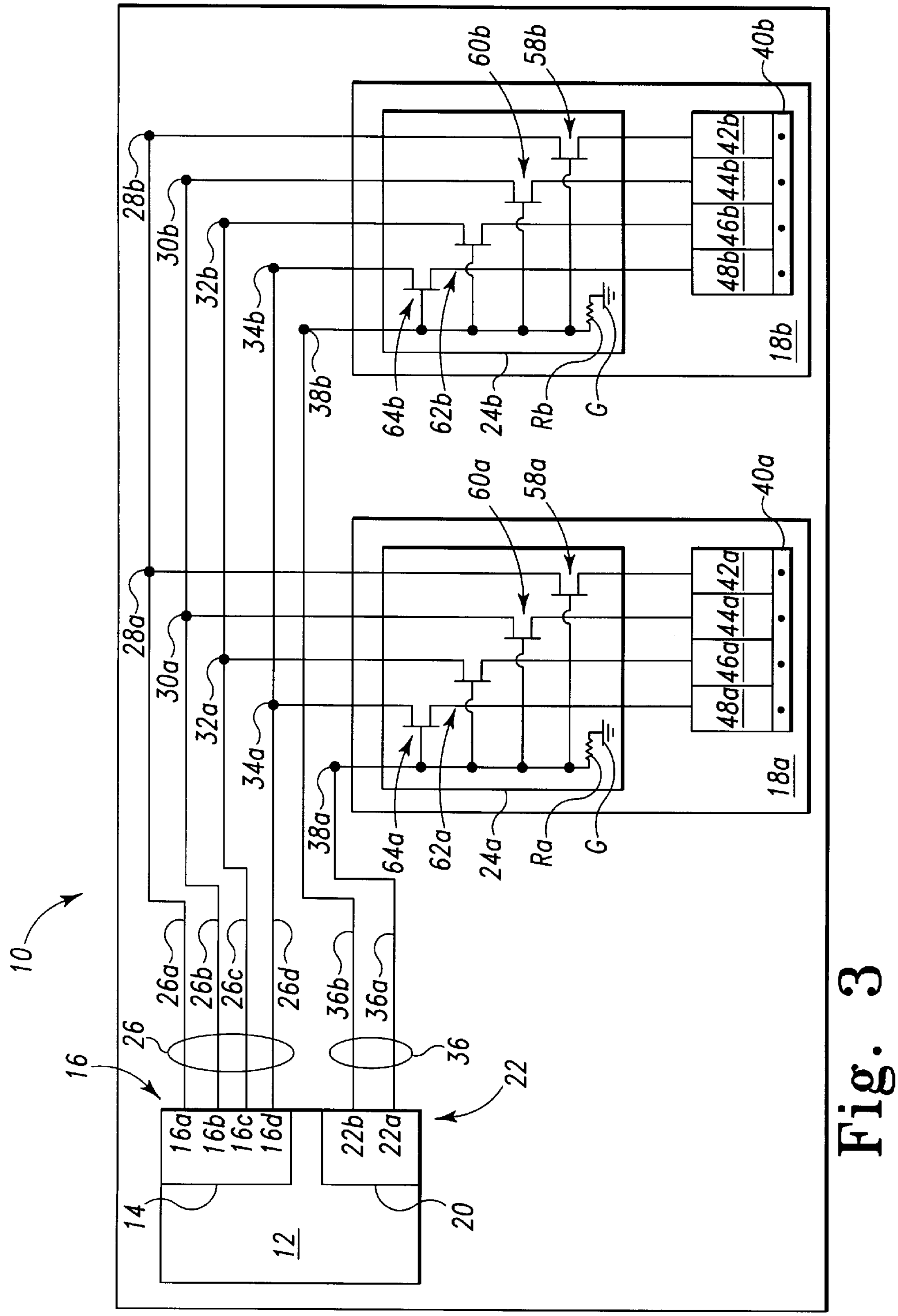
FIG. 3 shows a more detailed schematic diagram of the printing apparatus of FIG. 1.

FIG. 3 is a more detailed representation of the printer of FIG. 1, and includes the enable circuit as described above with respect to FIG. 2. As shown in FIG. 3, all command inputs (gates) of switch elements 58*a*, 60*a*, 62*a*, and 64*a* of printhead 18*a* are commonly connected via select input 38*a* and conductor 36*a* to select output 22*a* of printhead controller 12 and to ground G via resistor Ra, and all command inputs (gates) of switch elements 58*b*, 60*b*, 62*b*, and 64*b* of printhead 18*b* are commonly connected via select input 38*b* and conductor 36*b* to select output 22*b* of printhead controller 12 and to ground via resistor Rb. The current inputs (drains) of switch elements 58*a*, 60*a*, 62*a*, and 64*a* of printhead 18*a* associated with control inputs 28*a*, 30*a*, 32*a*, and 34*a*, respectively, are connected via control bus 26 to control outputs 16*a*–16*d*, respectively, of printhead controller 12. Likewise, the current inputs (drains) of switch elements 58*b*, 60*b*, 62*b*, and 64*b* of printhead 18*b* associated with control inputs 28*b*, 30*b*, 32*b*, and 34*b*, respectively, are also connected via control bus 26 to control outputs 16*a*–16*d*, respectively, of printhead controller 12. The current outputs (sources) of switch elements 58*a*, 60*a*, 62*a* and 64*a* of printhead 18*a* are connected to ink jet firing circuits 42*a*, 44*a*, 46*a*, and 48*a*, respectively. The current outputs (sources) of switch elements 58*b*, 60*b*, 62*b*, and 64*b* of printhead 18*b* are connected to ink jet nozzle firing circuits 42*b*, 44*b*, 46*b*, and 48*b*, respectively.

Although the invention has been described in relation to a printer having two printheads, the application of the invention is not so limited, and could be incorporated in a printer having any number of printheads greater than one. In such a case, as in the embodiments shown in FIGS. 1 and 3, the printhead controller of the printer would include a printhead driver circuit having a set of ink jet nozzle control outputs, which can be individually identified as control outputs 1 to N, wherein N represents a positive integer corresponding to the number of ink jet nozzle firing circuits and ink jet nozzles on each printhead, and further include a printhead selection circuit having a plurality of printhead select outputs, which can be individually identifiable as select outputs 1 to M, wherein M represents a positive integer corresponding to the number of printheads to be controlled. Each of the plurality of printheads would include a printhead enable circuit, for example, of the type shown in FIG. 2 and described above, wherein the control inputs of the printhead enable circuit are individually, electrically coupled to one of the ink jet nozzle control outputs 1 to N. Each output of the enable circuit is coupled to one of the plurality of individually controllable ink jet nozzle firing circuits, and the select input of each printhead is electrically coupled to one of the printhead select outputs 1 to M. In operating such a printer, the printhead controller supplies a select signal via one of the select outputs 1 to M to a printhead enable circuit of one of the plurality of printheads to select that particular printhead for printing. The printhead driver circuit then supplies control signals via the control outputs 1 to N and the enable circuit to control the plurality of individually controllable ink jet nozzle firing circuits of the selected printhead, which in turn controls the ink output of the ink jet nozzles thereof.

Although the invention has been described with reference to preferred embodiments, workers skilled in the art will recognize that changes may be made in form and in detail without departing from the spirit and scope of the following claims.

What is claimed is:

1. An ink jet printing apparatus, comprising:

a printhead controller including a printhead driver circuit having a set of ink jet nozzle control outputs and a printhead select circuit having a plurality of printhead select outputs; and a plurality of printheads, wherein each printhead includes a plurality of ink jet nozzles, a plurality of individually controllable ink jet nozzle firing circuits, and a printhead enable circuit, wherein said printhead enable circuit is electrically coupled between and interconnects said plurality of individually controllable ink jet nozzle firing circuits of said each printhead and said set of ink jet nozzle control outputs of said printhead driver circuit, wherein said set of ink jet nozzle control outputs is common to each of said plurality of printheads, and wherein said printhead enable circuit is electrically coupled to one of said plurality of printhead select outputs and enables the electrical conduction of said plurality of controllable ink jet nozzle firing circuits of said printhead upon receipt of a printhead select signal from one of said printhead select outputs of said printhead select circuit.

2. The ink jet apparatus of claim 1, wherein said printhead select circuit supplies a printhead select signal to the enable circuit of one of said plurality of printheads via one of said printhead select outputs to select said one of said plurality of printheads for printing, and wherein said driver circuit supplies control signals via said set of ink jet nozzle control outputs to control the plurality of individually controllable ink jet nozzle firing circuits of the selected one of said plurality of printheads for controlling the output of the ink jet nozzles thereof.

3. The ink jet printing apparatus of claim 1, wherein each printhead enable circuit comprises a plurality of switch elements, each having a command input, a current input and a corresponding current output, wherein all command inputs of said plurality of switch elements of a first printhead are commonly connected to one of said plurality of select outputs, wherein each of said current inputs is individually connected to one of said control outputs, and wherein each of said current outputs corresponding to each of said current inputs is connected to a corresponding one of said plurality of ink jet firing circuits.

4. The ink jet print apparatus of claim 3, wherein said switch element comprises a field effect transistor.

5. An ink jet printhead, comprising:

a plurality of individually controllable ink jet nozzles;

a plurality of ink jet firing circuits, wherein each of said plurality of ink jet firing circuits is positioned near a corresponding one of said plurality of individually controllable ink jet nozzles; and an enable circuit electrically coupled to said plurality of ink jet firing circuits for selectably enabling electrical conduction of said plurality of ink jet firing circuits, wherein said enable circuit comprises a plurality of switch elements, each having a command input, a current input and corresponding current output, wherein all command inputs of said plurality of switch elements of said printhead are commonly connected to a single select input port to provide for individual connection of each of said current inputs to an external source, and wherein each of said current inputs is connected to a separate control input port, and wherein each of said current outputs corresponding to each of said current inputs is individually connected to a corresponding one of said plurality of ink jet firing circuits.

6. The ink jet printhead of claim 5, wherein each of said plurality switch elements comprises a field effect transistor.

7. An ink jet printing apparatus, comprising:

a printhead controller including a printhead driver circuit having a set of ink jet nozzle control outputs individually identifiable as control outputs 1 to N, wherein N represents a positive integer corresponding to the number of ink jet nozzles in each printhead to be controlled, and including a printhead selection circuit having a plurality of printhead select outputs individually identifiable as select outputs 1 to M, wherein M represents a positive integer corresponding to the number of printheads; and a plurality of printheads, wherein each printhead includes a plurality of ink jet nozzles and a corresponding plurality of individually controllable ink jet nozzle firing circuits which are individually electrically coupled to corresponding control outputs 1 to N via a printhead enable circuit, and wherein said printhead enable circuit is electrically coupled to said plurality of individually controllable ink jet nozzle firing circuits and electrically coupled to one of said printhead select outputs 1 to M, wherein said printhead controller supplies a select signal via one of said select outputs 1 to M to a printhead enable circuit of one of said plurality of printheads to select said one of said plurality of printheads for printing, and wherein said driver circuit supplies control signals via said control outputs 1 to N to control the plurality of individually controllable ink jet nozzle firing circuits of the selected one of said plurality of printheads for controlling the output of the ink jet nozzles thereof.

8. The ink jet printing apparatus of claim 7, wherein each printhead enable circuit comprises a plurality of switch elements, each having a command input, a current input and a corresponding current output, wherein all command inputs of said plurality of switch elements of a first printhead are commonly connected to one of said select outputs 1 to M, wherein each of said current inputs is individually connected to one of said control outputs 1 to N, and wherein each of said current outputs corresponding to each of said current inputs is individually connected to a corresponding one of said plurality of ink jet firing circuits.

9. The ink jet print apparatus of claim 7, wherein said switch element comprises a field effect transistor.

* * * * *